US010915262B2

(12) United States Patent
Bhagwat et al.

(10) Patent No.: US 10,915,262 B2
(45) Date of Patent: Feb. 9, 2021

(54) HYBRID STORAGE DEVICE PARTITIONS WITH STORAGE TIERS

(71) Applicant: Seagate Technology LLC, Cupertino, CA (US)

(72) Inventors: Rajesh Maruti Bhagwat, Pune (IN); Nitin S. Kabra, Pune (IN); Nilesh Govande, Pune (IN); Manish Sharma, Bangalore (IN); Joe Paul Moolanmoozha, Bangalore (IN); Alexander Carl Worrall, Waterlooville (GB)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 141 days.

(21) Appl. No.: 15/920,264

(22) Filed: Mar. 13, 2018

(65) Prior Publication Data
US 2019/0286355 A1      Sep. 19, 2019

(51) Int. Cl.
*G06F 12/00* (2006.01)
*G06F 13/00* (2006.01)
(Continued)

(52) U.S. Cl.
CPC .......... *G06F 3/0644* (2013.01); *G06F 3/0604* (2013.01); *G06F 3/068* (2013.01); *G06F 3/0647* (2013.01); *G06F 12/08* (2013.01); *G06F 12/10* (2013.01); *G06F 3/0683* (2013.01); *G06F 3/0688* (2013.01); *G06F 16/185* (2019.01); *G06F 2212/1008* (2013.01); *G06F 2212/205* (2013.01); *G06F 2212/657* (2013.01)

(58) Field of Classification Search
CPC ..... G06F 3/0683; G06F 3/0688; G06F 16/182
USPC .......................................................... 711/117
See application file for complete search history.

(56) References Cited

U.S. PATENT DOCUMENTS

2007/0288692 A1* 12/2007 Bruce ..................... G06F 3/061
                                                                                711/113
2011/0138148 A1*  6/2011 Friedman ............. G06F 3/0613
                                                                                711/173
(Continued)

OTHER PUBLICATIONS

Dell Engineering, "The Architectural Advantages of Dell SC Series Automated Tiered Storage," A Dell Technical White Paper 3133-WP-SC, Jan. 2016, 17 pages.
(Continued)

*Primary Examiner* — Edward J Dudek, Jr.
*Assistant Examiner* — Sidney Li
(74) *Attorney, Agent, or Firm* — Holzer Patel Drennan (57) ABSTRACT

A hybrid storage device includes a first storage medium configured to store data at a first speed and a second storage medium configured to store data at a second speed. The first storage medium may be a NAND flash storage medium, and the second storage medium may be disc storage medium. Partitions of the first storage medium are associated with partitions of the second storage medium to form at least two storage tiers. Each of the storage tiers may include different NAND partition capacities. The storage device further includes a peer to peer communication channel between the first storage medium and the second storage medium for moving data between a NAND partition and HDD partition. The storage device is accessible via a dual port SAS or PCIe interface.

19 Claims, 11 Drawing Sheets

(51) Int. Cl.
  *G06F 13/28* (2006.01)
  *G06F 3/06* (2006.01)
  *G06F 12/08* (2016.01)
  *G06F 12/10* (2016.01)
  *G06F 16/185* (2019.01)

(56) References Cited

U.S. PATENT DOCUMENTS

| | | | |
|---|---|---|---|
| 2012/0042124 A1* | 2/2012 | Miyamoto | G06F 3/0605 711/114 |
| 2012/0198152 A1* | 8/2012 | Terry | G06F 11/2094 711/114 |
| 2013/0132638 A1 | 5/2013 | Horn et al. | |
| 2014/0207996 A1 | 7/2014 | Fisher et al. | |

OTHER PUBLICATIONS

Dot Hill Systems, "Real-Time Storage Tiering for Real-World Workloads," Dot Hill Systems White Paper, 2012, 10 pages.
Evans, Chris, "Top Five Things to Know About Flash and Storage Tiering," ComputerWeekly.com, Nov. 26, 2015, 3 pages.
Freeman, Larry, "What's Old Is New Again—Storage Tiering," NetApp, Inc., SNIA Tutorial, Storage Networking Industry Assoc., 2012, 23 pages.
Seagate Technology LLC, "Seagate 12G Hybrid 4005," Seagate.com, 2017, 2 pages.
Seagate Technology LLC, "The Seagate Kinetic Open Storage Vision," Seagate.com, 2018, 6 pages.
Wilkinson, et al, "Storj a Peer-to-Peer Cloud Storage Network," Storj tutorial, Dec. 15, 2016, 37 pages.

\* cited by examiner

HYBRID STORAGE DEVICE PARTITIONS WITH STORAGE TIERS

BACKGROUND

Hybrid drives may include one or more disc storage media and one or more flash storage media such as NAND. The NAND is generally utilized as a cache for the one or more disc storage media. In a storage system that utilizes one or more solid state drives (SSDs) and one or more hard disc drives (HDDs), the SSDs may be utilized as a first storage tier, and the HDDs may be utilized as a second storage tier. A storage system controller manages storage of data to the different storage tiers in such a storage system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In one example implementation, a method includes partitioning a first storage medium into a first partition comprising a portion of the first storage medium and partitioning a second storage medium into a second partition comprising a portion of the second storage medium. The first storage medium is configured to store data at a first speed, and the second storage medium is configured to store data at a second speed. The second speed is considerably lower than the first speed. The method further includes associating the first partition with the second partition to form a first storage tier of at least two storage tiers. The at least two storage tiers include different capacities of the first storage medium.

These and various other features and advantages will be apparent from a reading of the following Detailed Description.

DETAILED DESCRIPTION

A storage device includes one or more disc storage media and one or more flash storage media such as NAND. The disc storage media and the flash storage media are divided into two or more partitions comprising a portion of the storage media. In some embodiments, the partition can include varying sizes of the total available space for a given media or similar sizes, but each will contain capacities less than the total available space for a given media. A partition of the disc storage media and a partition of the flash storage media are associated to form a storage tier of at least two storage tiers. Each of the storage tiers correspond to logical block address (LBA) range addressable by a host device. Each of the storage tiers may include different amounts of flash (e.g., different flash partition capacities). The storage device further includes a peer to peer communication channel between the flash storage media and the disc storage media for quickly moving data between partitions of a storage tier. The storage device may be included in a storage system comprising a plurality of storage devices. The storage device may be presented to a host (or system controller) as an HDD device with NAND flash, a separate HDD device and SSD device, or a SSD device with tiers including HDD partitions.

Figure 1:
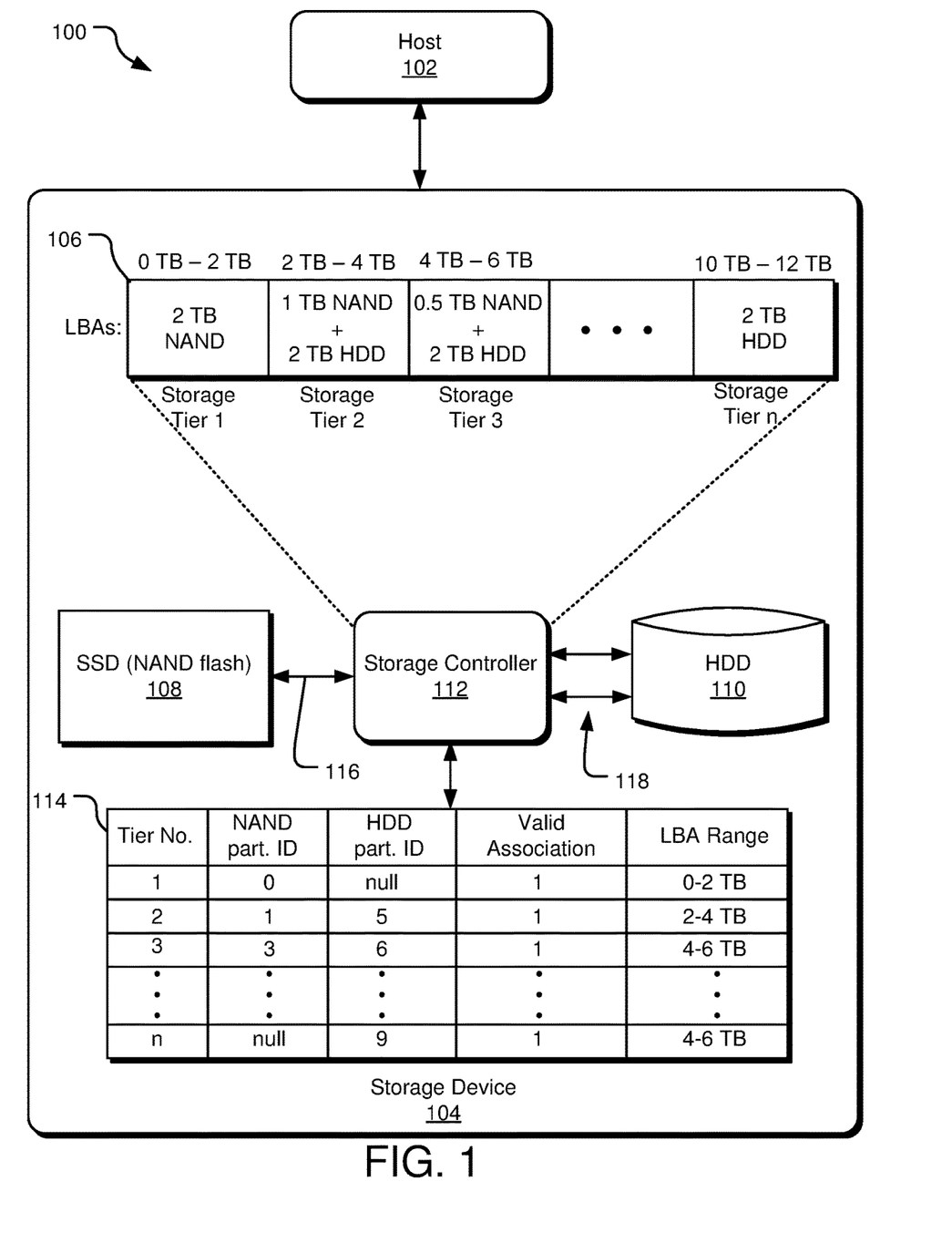
FIG. 1 illustrates a block diagram of an example storage device with tiered storage.

FIG. 1 illustrates a block diagram 100 of an example storage device 104 with tiered storage. The block diagram 100 includes a host computing device (e.g., a host 102) which is communicatively connected to the storage device 104. The storage device 104 may be one of many storage devices implemented as a storage server or system. The host 102 directs data read and/or write requests to one or more of the storage devices (e.g., the storage device 104).

The storage device 104 includes one or more solid state storage media (e.g., a SSD 108) and one or more disc storage media (e.g., a HDD 110). It should be understood that the storage device 104 may include other types of storage media such as volatile and non-volatile storage media. It should be further understood that the SSD 108 and the HDD 110 are for illustrative purposes and that the storage device 104 includes a first storage medium configured to store data at a first speed and a second storage medium configured to store data at a second speed. The second speed may be considerably lower than the first speed. In some embodiments, the storage media are characterized as having first and second access rates (that may include sequential, random, or mixed data). In the illustrated implementation, the second storage medium is the HDD 110, which stores data at considerably slower rate than the first storage medium (e.g., the SSD 108). For example, the HDD 110 may have an input/output operations per second (IOPS) random or mixed performance range from about 15 IOPS to about 250 IOPS and in some applications 900 IOPS, and the SSD 108 may have an IOPS (random) range of about 9000 IOPS to about 10 million IOPS. Such a range spread from HDD to SSD performance may be considered "considerably lower." In some example implementations, the second storage medium has an access rate of about ninety percent lower than the first storage medium, but it should be understood that other percentages are contemplated (e.g., seventy-five percent, fifty percent, twenty percent). Further, it should be understood that the implementations described herein may be applicable to different storage media with different performance characteristics. In FIG. 1, the HDD 110 may be implemented as one or more high capacity magnetic or optical discs, and the SSD 108 is implemented as NAND flash, but it should be understood that the SSD 110 may alternatively be another type of solid state media or dynamic random access memory. In some example implementations, the storage device 104 may include tiers implemented over more than two types of storage media. For example, a tier may include a partition of DRAM, a partition of on-chip SRAM, a partition of SSD, and a partition of HDD. Tiers may also include partitions of within a SSD of 3D NAND and non-3D NAND. Tiers within a HDD may include partitions of conventional recording, shingled magnetic recording, outer diameter recording, media caching and assisted magnetic recording (such as heat assisted magnetic recording).

The storage device 104 implements a primary user data storage area referred to herein as a main store that includes a combination of the SSD 108 and the HDD 110. A storage controller 112 manages a mapping of physical data blocks within the main store to logical block addresses (LBAs) 106 utilized by the host 102 when reading user data from and writing user data to the storage device 104. The storage controller 112 implements a tiered storage scheme that associates one or more partitions of the SSD 108 with one or more partitions of the HDD 110 to create tiered storage. A "partition" is a raw memory area (e.g. portion) of a memory region (e.g., SSD 108 or HDD 110) that is utilized to form a storage tier. An "association" is a bound pair of a partition of a first storage medium (e.g., the SSD 108) with a partition of a second storage medium (e.g., the HDD 110).

The storage controller 112 presents 12 TB of addressable user data storage as the LBAs 106, but it should be understood that other capacities of addressable user data storage are contemplated. The first 2 TB of LBA space is a storage tier 1. The storage tier 1 is allocated an association of a 2 TB partition of NAND storage (e.g., 2 TB of the SSD 108) and no partition (e.g., 0 TB) of the HDD 110. Accordingly, the storage tier 1 is the fastest storage tier relative to the other storage tiers because it comprises NAND storage and no HDD storage. A storage tier 2 is allocated an association of a 1 TB partition of NAND storage (e.g., the SSD 108) and a 2 TB partition of the HDD 110. A storage tier 3 is allocated an association of a 0.5 TB NAND partition and a 2 TB HDD partition. A storage tier n includes a 2 TB HDD partition and no NAND partition. Accordingly, the amount of space for the NAND partition for each storage tier decreases from storage tier 1 to storage tier n. It should be understood that the tiers are for illustrative purposes and that other partition sizes and associations are contemplated.

Within a storage tier that includes an association of a partition of NAND (e.g., the SSD 108) and a partition of the HDD 110, the NAND space may function as a cache for the HDD partition. For example, the 1 TB NAND partition for the storage tier 2 may function as a cache for the 2 TB HDD partition. Accordingly, data of the storage tier 2 may be moved between the NAND and the HDD based on one or more parameters, such as data heat. Cold data (infrequently or least recently accessed) may be periodically flushed from the 1 TB NAND partition to the 2 TB HDD partition, and hot data (frequently or recently accessed) data may be allocated to the 1 TB NAND partition. Accordingly, read/write requests directed to the storage tier 2 may be served from the 1 TB NAND partition or the 2 TB HDD partition.

The storage device 104 may implement static tiering or dynamic tiering. In a statically tiered device, the partitions and associations are allocated in the device manufacturer. The partitions and their associations are fixed and are generally not modified in the field (e.g., at the host 102). A dynamically tiered device may change associations and/or partitions in the field based on one or more monitored storage parameters or based on instructions from the host 102. One example parameter that is monitored for a dynamically tiered device is data heat of a data allocated to the tiers. For example, if data heat of the data allocated to the storage tier 3 is higher than the data heat of the data allocated to the storage tier 2 of FIG. 1, then the storage controller 112 may implement an association change that allocates a larger partition of the SSD 108 to the storage tier 3.

A dynamically tiered device may be semi-dynamic or fully dynamic. In a semi-dynamic device, the storage device 104 is pre-partitioned (in both SSD 108 and HDD 110) and only the associations of the pairs of partitions are changed to modify storage tiers. The size and locations of the partitions of SSD 108 and HDD 110 generally are not changed in a semi-dynamic device. In a fully dynamic device, the partitions and the associations may be modified based on the one or more monitored parameters or based on instructions received from a host. Tiers in dynamically tiered devices (e.g., semi-dynamic or fully dynamic) may be controlled by a host (e.g., host initiated) or controlled by the storage device 104 (e.g., adaptive or device initiated). In some example implementations, the host 102 and the storage device 104 have the ability to change associations and/or partitions (e.g., cooperative). In a host initiated dynamic device, the host 102 monitors the workload and/or heat index of data stored to different tiers (e.g., LBA ranges) and makes changes to associations and/or partitions. In an adaptive or device initiated dynamic device, the storage device 104 monitors the workload/heat index of data stored to different tiers and makes changes to associations and/or partitions. In a cooperative system, the host 102 and the storage device 104 monitor the workload (e.g., heat index) of data. The host 102 may provide hints about the heat index of LBA ranges when data is written to the storage device 104, and the storage device 104 may change the tiers by changing associations and/or partitions. In some example implementations, the storage device 104 maintains a record of workload activities and periodically presents logs of activity to the host 102 or presents the logs to the host 102 responsive to a request from the host 102. The host 102 may then modify the tiering by changing associations and/or partitions.

The storage controller 112 manages and documents storage tiers using an association table 114. The association table 114 may be stored in the SSD 108, the HDD 110 or a different storage media (not shown). In one example implementation, the association table 114 is stored in the SSD 108 for fast access. The storage controller updates the association table 114 when one or more partitions and/or associations are modified. Furthermore, a new row may be added when the number of storage tiers are increased by adding a new association/partition. The various partitions are accessed and managed via partition IDs. The valid association column of the association table 114 indicates whether a tier is currently usable to store data. A tier may be invalid when the tier is in a transient state (e.g., being modified). Generally, after a tier is formed (e.g., modified), the tier will transition to a valid state.

In some example implementations, a peer to peer communication channel exists between the HDD 110 and the SSD 108. In the illustrated implementation, the peer to peer communication channels are provided through the storage controller 112. For example, the HDD 110 is accessed via a dual port interface 118, and the SSD 108 is accessed via a NAND flash interface 118. The storage controller 112 manages data movement between the SSD 108 and the HDD 110. The peer to peer channels allow for data to be quickly moved between a NAND partition and an HDD partition in a storage tier. In some embodiments, the peer to peer channel includes no host involvement.

Figure 2:
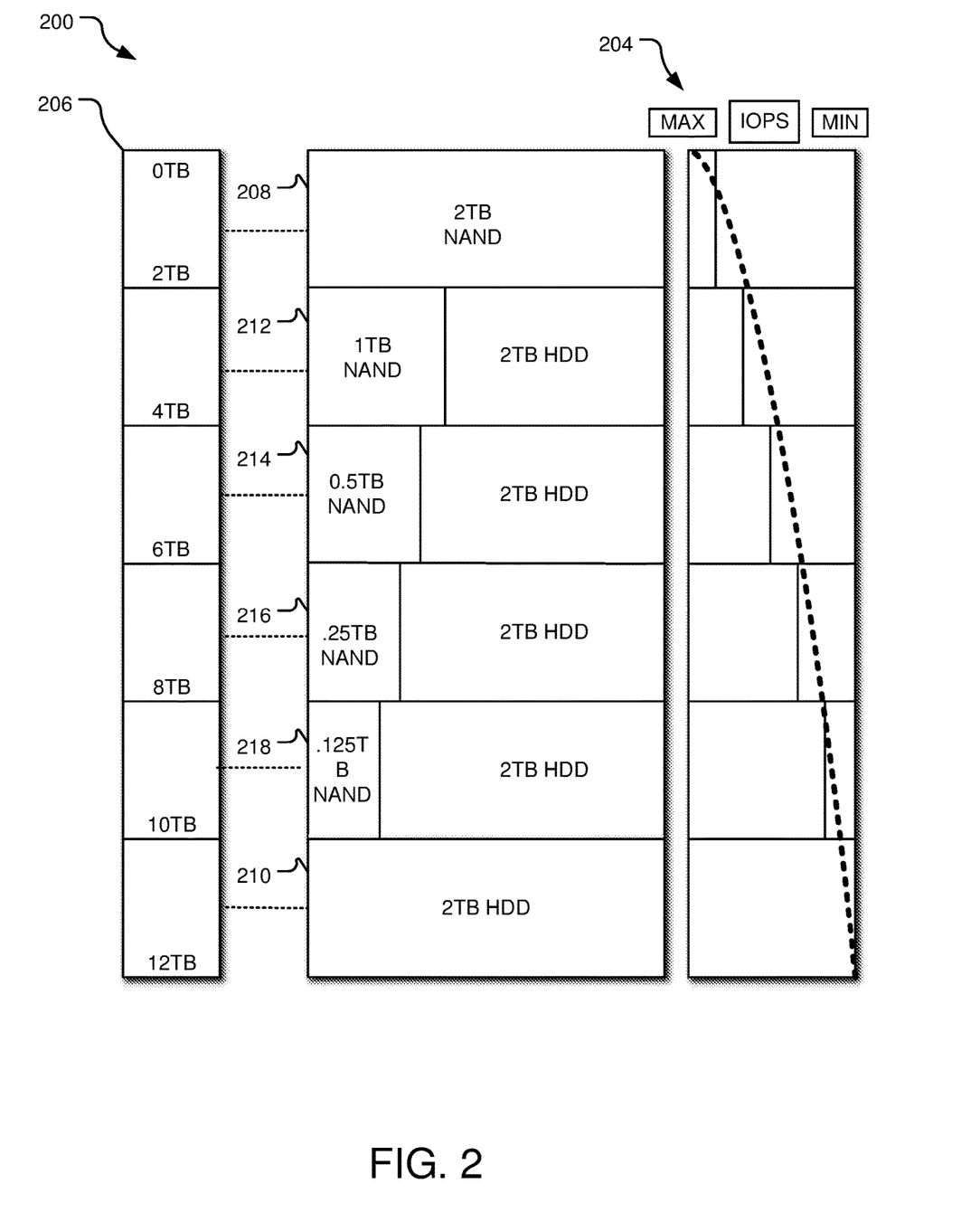
FIG. 2 illustrates an example tiering diagram of storage device and an input/output performance chart.

FIG. 2 illustrates an example tiering diagram 200 of storage device and input/output operations performance chart 204. The tiering diagram 202 includes a logical block address (LBA) range 206 that is usable by a host device (not shown) to access (read/write) data on the storage device. The LBA range 206 corresponds to a plurality of storage tiers. A first storage tier 208 is a NAND only tier that includes zero HDD storage, and a last storage tier 210 is an HDD only tier that includes zero NAND storage. A range from 0 TB to 2 TB of LBA space corresponds to the first storage tier 208, and a range from 10 TB to 12 TB of LBA space corresponds to the last storage tier 210. Other storage tiers include an association of a partition of NAND storage of the storage device and a partition of HDD storage of the storage device. For example, a storage tier 212 includes a 1 TB partition of NAND storage and a 2 TB partition of HDD storage. A storage tier 214 includes a 0.5 TB NAND partition and a 2 TB partition of HDD storage. A storage tier 216 includes a 0.25 TB NAND partitioned and a 2 TB partition of HDD storage. A storage tier 218 includes a 0.125 TB NAND partition and a 2 TB partition of HDD storage. A range from 2 TB to 4 TB of LBA range 206 corresponds to the storage tier 212, a range from 4 TB to 6 TB of LBA range 206 corresponds to the storage tier 214, etc. It should be understood that the illustrated proportions of NAND and HDD space per each storage tier are for illustrative purposes only.

The input/output operations performance chart 204 illustrates the input/out operations per second (IOPS) per storage tier. As illustrated, the first storage tier 208 that includes NAND storage and zero HDD storage has a high IOPS relative to the other storage tiers. The IOPS decreases with the decreasing amount of NAND space allocated to a storage tier. The performance variation between storage tiers is smooth and relatively small. A host device may direct access requests (e.g., read/write) to the different storage tiers using the LBA range 206. The host device may direct data that is frequently accessed to one of the storage tiers including more NAND storage relative to other storage tier (e.g., a storage tier with higher IOPS such as the first storage tier 208 or the storage tier 212). Data that is not frequently accessed may be directed to one of the storage tiers with lower IOPS (e.g., the storage tier 218 or the last storage tier 210). Furthermore, data stored within storage tiers that include both NAND and HDD space (e.g., the storage tier 212, 214, 216, and 218) may be stored in either the NAND partition or the HDD partition dependent on one or more parameters such as data heat. The NAND space in one of these storage tiers functions as a cache for the data.

Figure 3:
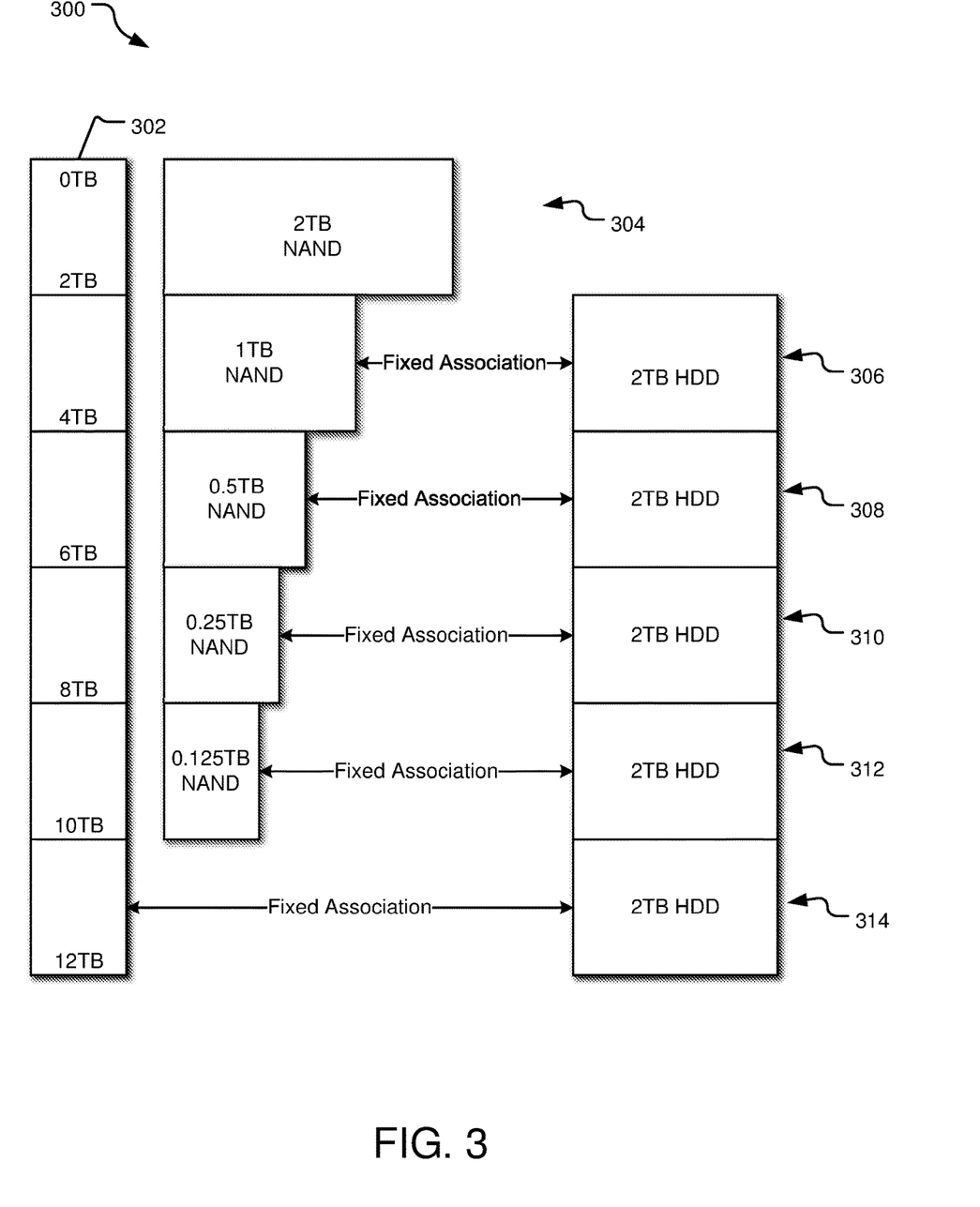
FIG. 3 illustrates an example tiering diagram of an example storage device with static storage tiers.

FIG. 3 illustrates an example tiering diagram 300 of an example storage device with static storage tiers. The tiering diagram includes a logical block address (LBA) range 302 that is addressable by a host device (not shown) to access data. The LBA ranges are mapped by a storage system controller (not shown) to a plurality of storage tiers 304, 306, 308, 310, 312, 314. Each of the storage tiers includes a different amount of NAND space. It should be understood that the illustrated NAND capacities are for illustrative purposes only and that other capacities are contemplated. The storage device presents 12 TB of addressable space (via the LBA range 302). The 0 TB to 2 TB of LBA space is mapped to the storage tier 304 that includes 2 TB of NAND space and 0 TB of HDD space. The 2 TB to 4 TB of LBA space is mapped to the storage tier 306 that includes an association of 1 TB partition of NAND and a 2 TB partition of HDD. Other storage tiers 308, 310, and 312 of the tiering diagram 300 include different size NAND partitions associated with respective 2 TB HDD partitions. It should be understood that the HDD partitions may vary in size. The storage tier 314 includes a 2 TB partition of HDD space and 0 NAND space. The associations between NAND partitions and HDD partitions are "fixed" in that the partitions or associations are not changed by the storage device or the host.

Because the storage device is static (e.g., partitions and associations are fixed), the latency of the storage tiers (e.g., via addressable LBA range 302) may be fairly predictable. In some example implementations, such predictability may be desirable by a host device. Further in some implementations, the difference in latency between the storage tiers is relatively small. Thus, in some respects, a storage device implementing the tiering system disclosed herein may be faster than a conventional hybrid drive.

Figure 4:
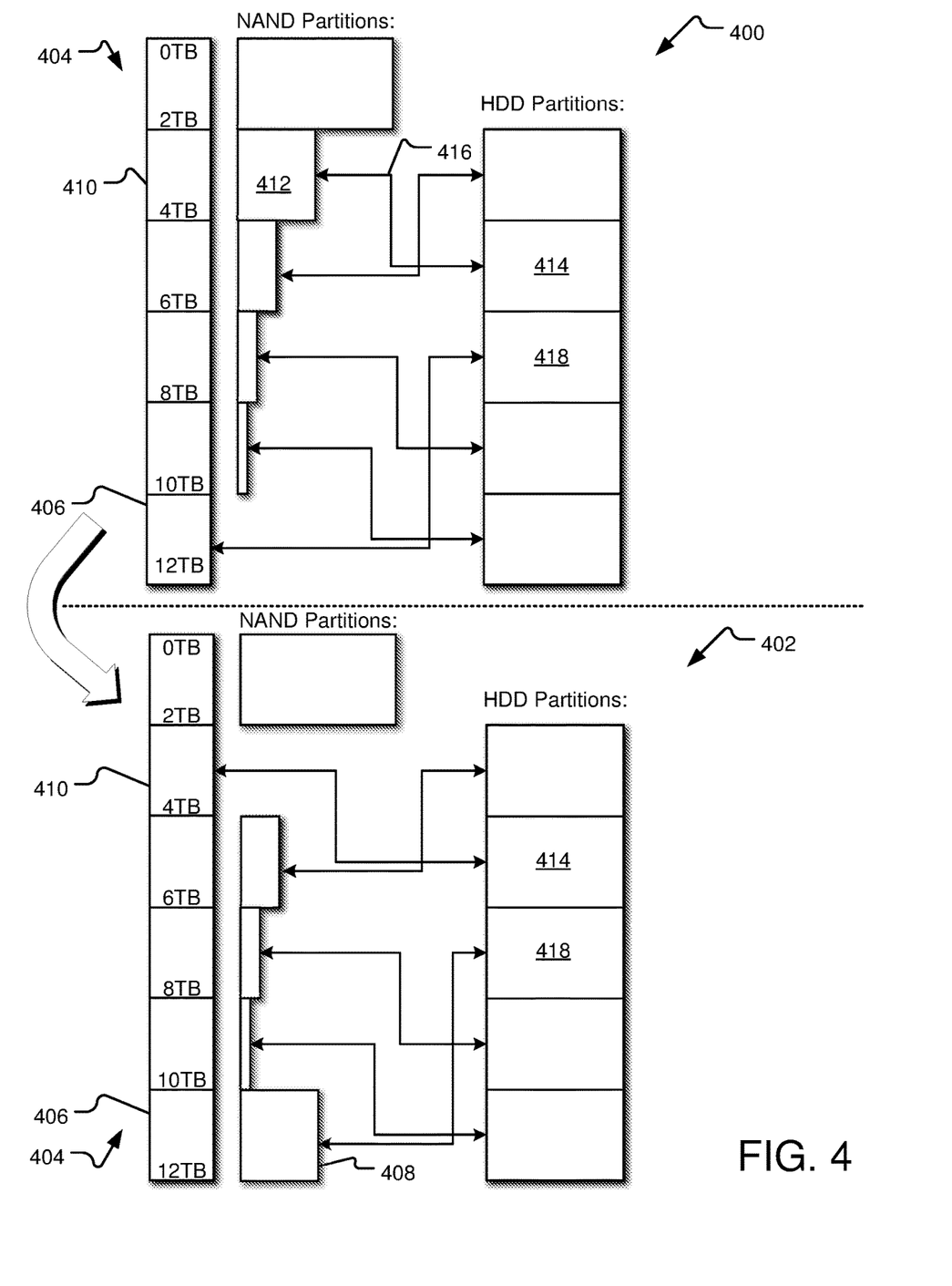
FIG. 4 illustrates example tiering diagrams of an example storage device with dynamic storage tiers.

FIG. 4 illustrates example tiering diagrams 400 and 402 of an example storage device with dynamic storage tiers. Specifically, FIG. 4 illustrates an example change in associations between different partitions of NAND space and HDD space of a storage device. The storage device includes a logical block address (LBA) range 404 that is addressable by a host device (not shown) to write data to and read data from the storage device. Particular LBA ranges correspond to different storage tiers. For example, an LBA range 410 (e.g., from 2 TB to 4 TB) in the tiering diagram 400 corresponds to storage tier that includes an association of a partition 412 of NAND space with a partition 414 of HDD space. Furthermore, in the tiering diagram 400, an LBA range 406 is a HDD only storage tier that includes a partition 418 of the HDD space. The arrows (e.g., an arrow 416) illustrate example associations between different partitions.

As illustrated by the modifications between the tiering diagram 400 and the tiering diagram 402, the associations between some partitions have changed. Such a change may be initiated by the storage device (e.g., a storage controller) or a host device based on one or more parameters such as data temperature. In some embodiments, data temperature may refer to the frequency at which certain data is accessed. In the tiering diagram 402, the LBA range 410 is now the HDD only tier and includes the HDD partition 418. The LBA range 406 (e.g., from 10 TB to 12 TB) now includes the NAND partition 412, which is associated with the HDD partition 418. Thus, in the tiering diagram 400, the LBA range 406 has a higher latency compared to the LBA range 410. After modification in the tiering diagram 402, the latency for the LBA range 406 is lower than the latency of the LBA range 410. Thus, in the tiering diagram 402, the LBA range 406 has a higher performance compared to the LBA range 406 in the tiering diagram 400.

Figure 5:
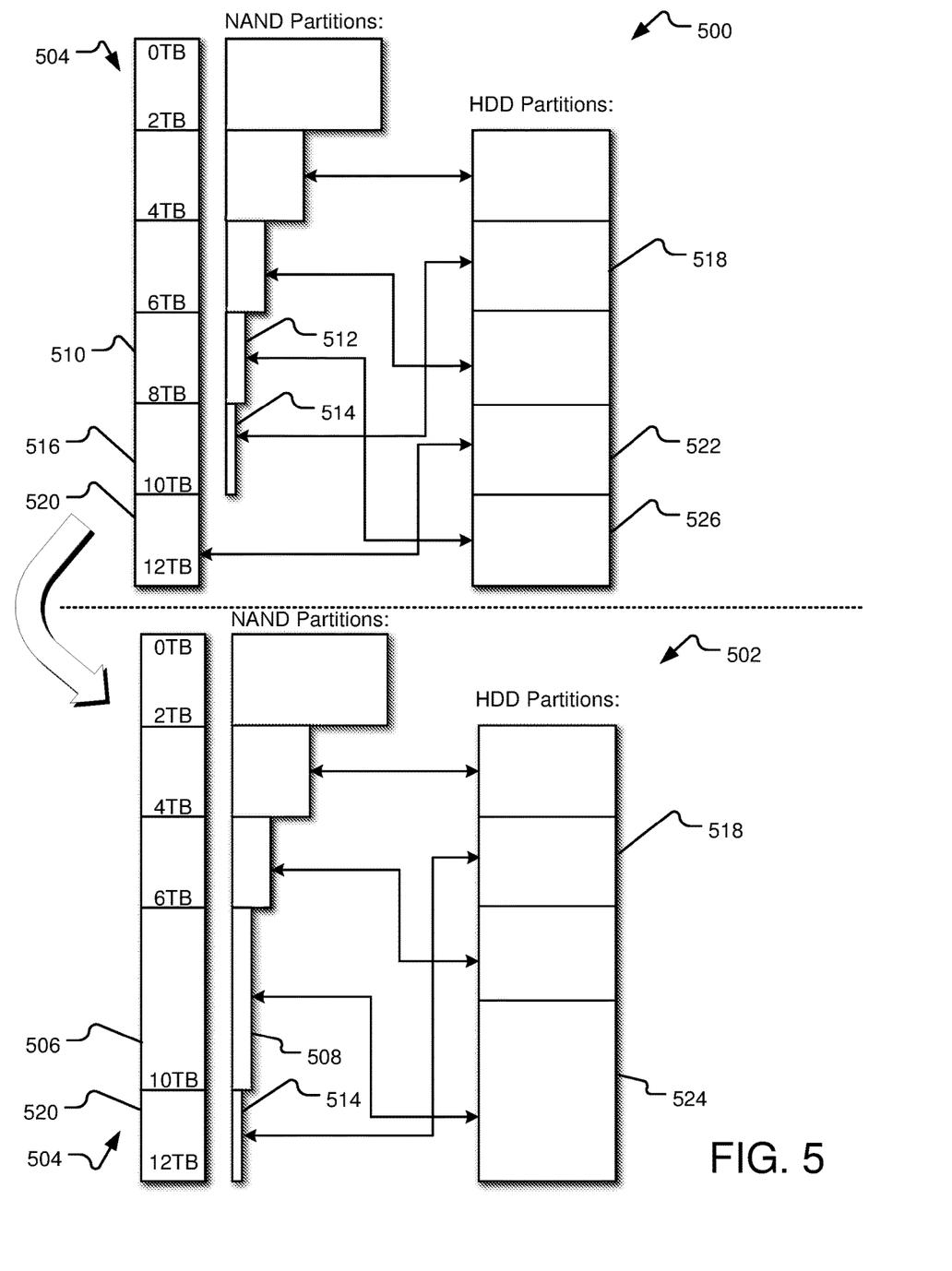
FIG. 5 illustrates example tiering diagrams of an example storage device with dynamic storage tiers.

FIG. 5 illustrates example tiering diagrams 500 and 502 of an example storage device with dynamic storage tiers. Specifically, FIG. 5 illustrates an example change in partitions and associations included in storage tiers of a storage device. The storage device includes a logical block address (LBA) range 504 that is addressable by a host device (not shown) to write data to and read data from the storage device. Particular LBA ranges correspond to different storage tiers. For example, in the tiering diagram 500, a LBA range 510 (6 TB to 8 TB LBA space) includes an association of a NAND partition 512 and a HDD partition 526. In another example in the tiering diagram 500, an LBA range 516 corresponds to an association of a NAND partition 514 a HDD partition 518. In yet another example in the tiering diagram 500, an LBA range 520 corresponds to an HDD only tier that includes an HDD partition 522.

Based on one or more parameters such as data temperature or based on an instruction from a host device (not shown), the storage device changes partitions and associations for tiers as shown in tiering diagram 502. A new tier is created that corresponds to an LBA range 506 (catering to 6 TB to 10 TB of addressable LBA space) and includes an association of a NAND partition 508 and an HDD partition 524. Furthermore, the LBA range 520 now corresponds to an association between the NAND partition 514 and the HDD partition 518. In effect, the association between the NAND partition 514 and the HDD partition 518 is reassigned to the LBA range 520. Furthermore, the HDD only tier is effectively deleted. The HDD space (e.g., the HDD partition 526 of the tiering diagram 500) is utilized to form the HDD partition 524 in the tiering diagram 502.

Figure 6:
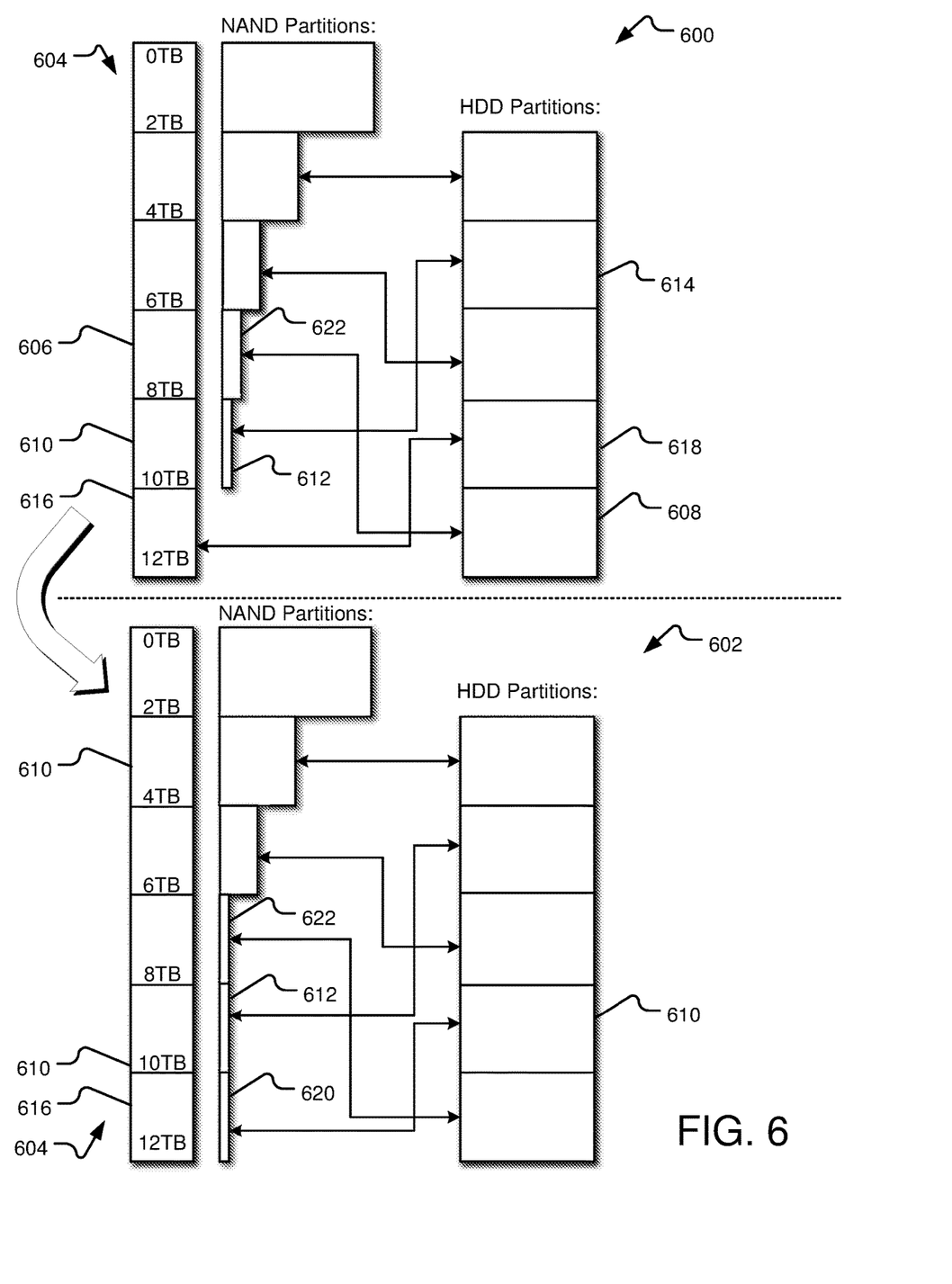
FIG. 6 illustrates example tiering diagrams of an example storage device with dynamic storage tiers.

FIG. 6 illustrates example tiering diagrams 600 and 602 of an example storage device with dynamic storage tiers. Specifically, FIG. 6 illustrates an example addition of partitions for a storage tier in the storage device. The storage device includes a logical block address (LBA) range 604 that is addressable by a host device (not shown) to write data to and read data from the storage device. Particular LBA ranges correspond to different storage tiers. For example, in the tiering diagram 600, an LBA range 606 (6 TB to 8 TB of addressable LBA space) corresponds to an association of a NAND partition 622 and an HDD partition 608. In another example in the tiering diagram 600, an LBA range 610 corresponds to an association of a NAND partition 612 and an HDD partition 614. In yet another example in the tiering diagram 600, an LBA range 616 corresponds to a HDD only tier that includes an HDD partition 618.

Based on a change in a parameter such as data temperature or based on instructions form a host device (not shown), the storage device changes the storage tiers by adding a partition as shown in tiering diagram 602. Specifically, a tier corresponding to the LBA range 616 is modified to include a NAND partition 620. Such a modification may be performed because the data heat corresponds to the LBA range 616 satisfies a tiering condition. Because the NAND media includes a finite amount of storage space, the storage controller may select an existing partition to reduce in size to create the NAND partition 620. In the illustrated implementation, the NAND partition 622 was reduced in capacity and the attained capacity is used to create the NAND partition 620. The storage controller may select a NAND partition to reduce in capacity based on the data temperature of data allocated to the storage tier corresponding to the partition. For example, a storage tier with colder data (and enough NAND to utilize) may be selected for reducing the size of the NAND partition. In some example implementations, multiple NAND partitions may be reduced in capacity to create a new partition. It should be understood that these described implementations are also applicable to the HDD partitions. An HDD partition may be created and added to a new or existing storage tier and existing HDD space (e.g., allocated to an existing partition) may be utilized to create a new HDD partition.

Figure 7:
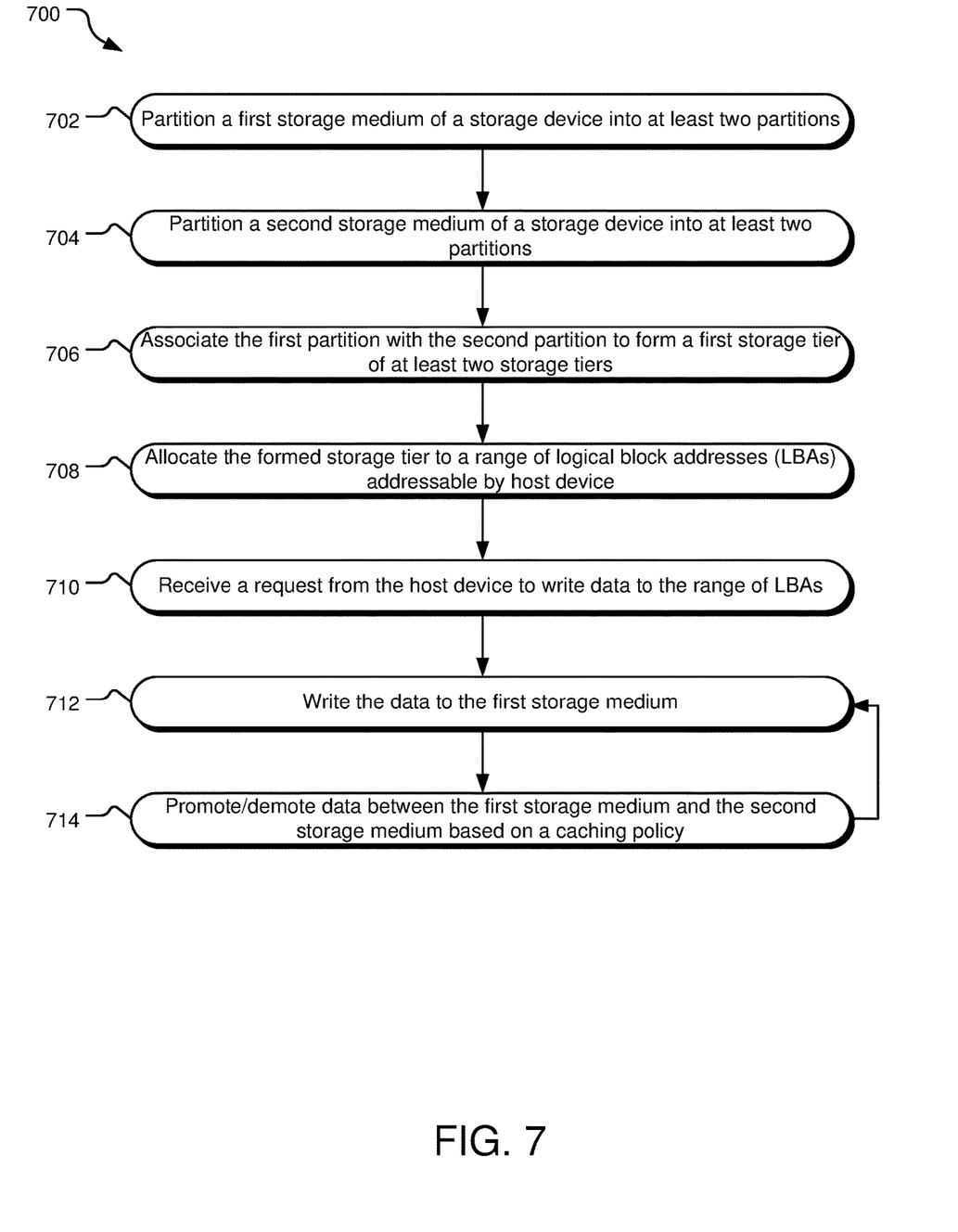
FIG. 7 illustrates example operations for forming and utilizing an example storage device implementing tiered storage.

FIG. 7 illustrates example operations 700 for forming and utilizing an example storage device implementing tiered storage as described herein. A first partitioning operation 702 partitions a first storage medium of a storage device into at least two partitions. A second partitioning operation 704 partitions a second storage medium of the storage device into at least two partitions. In implementations, the first storage medium is configured to store data at a first speed, and the second storage medium is configured to store data at a second speed. The second speed is considerably lower than the first speed. In one example implementation, the first storage medium is NAND storage, and the second storage medium is disc storage (e.g., HDD). An associating operation 706 associates the first partition with the second partition to form a first storage tier of at least two storage tiers. An allocating operation 708 allocates the formed storage tier to a range of logical block addresses (LBAs) addressable by a host device.

A receiving operation 710 receives a request from the host device to write data to the range of LBAs. A writing operation 712 writes the data to the first storage medium. A promoting/demoting operation 714 promotes and/or demotes data from the first storage medium to the second storage medium based on a caching policy. The storage device may continually/intermittently write data (e.g., the writing operation 712) and promote/demote data (e.g., the promoting/demoting operation 712) during operation. Accordingly, the first storage medium partition (e.g., NAND) functions as a cache for the second storage medium partition (e.g., HDD). The LBA space for a storage tier may be divided into "pages" of data that are moved between the first storage medium (cache) and the second storage medium (HDD/main store) based on one or more caching policies (e.g., first in first out (FIFO), last in first out (LIFO), least recently sued (LRU), or variations thereof). In some example implementations, a user may designate some data for cache storage (e.g., a NAND partition) such that the data is easily/quickly retrievable.

Figure 8:
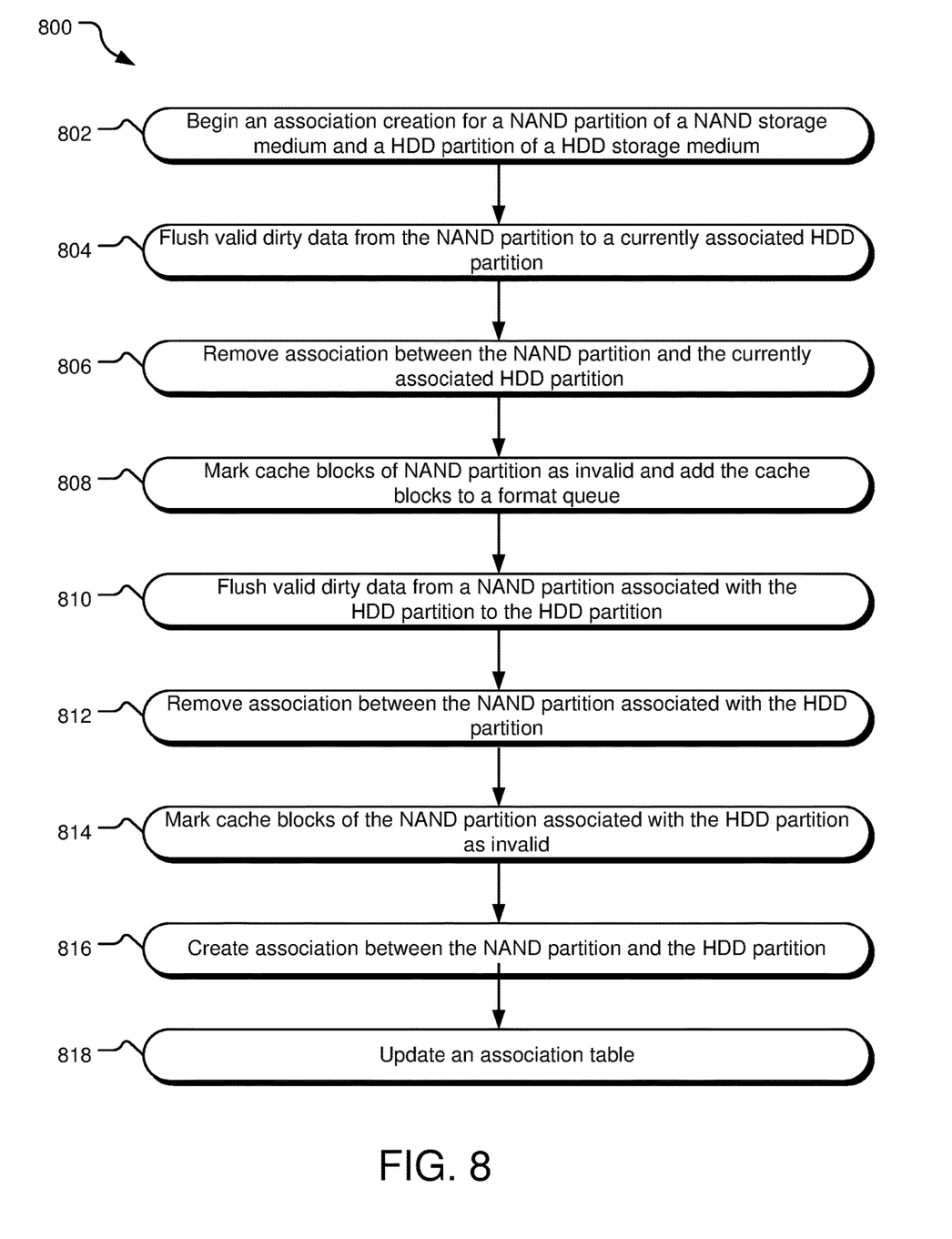
FIG. 8 illustrates example operations for changing associations in a storage device implementing tiered storage.

FIG. 8 illustrates example operations 800 for changing associations in a storage device implementing tiered storage. A beginning operation 802 begins an association creation for a NAND partition of a NAND storage medium of the storage device and a HDD partition of a HDD storage medium of the storage device. It should be understood that the storage medium types are illustrative and that other types of storage mediums are contemplated. The beginning operation 802 may be initiated by a storage controller responsive to satisfaction of one or more tiering conditions by one or more of the storage tiers of the storage tiers. For example, the data temperature of data allocated to a storage tier may reach a threshold, while the data temperature of data allocated to a different storage tier may fall below a threshold. Accordingly, the tiers may be changed (e.g., more NAND allocated to the higher temperature tier and less NAND space allocated to the lower temperature tier). In another example, a host device may initiate the creation/change of the associations based on the data temperature or based on another aspect.

A flushing operation 804 flushes valid dirty data from the NAND partition to a currently associated HDD partition. The storage device (e.g., the storage controller) may determine valid/invalid dirty/clean data using a metadata table, for example. Any host write operations during a flushing operation are directed to the corresponding HDD partition. A removing operation 806 removes an association between the NAND partition and the currently associated HDD partition. In other words, the current association between the NAND partition and HDD partition is removed. A marking operation 808 marks cache blocks of the NAND partition as invalid and adds the cache blocks to a format queue. Any host read accesses during the format operation of the NAND partition will be a cache miss and land on the HDD directly. Any host write access can be diverted temporarily to an over provisioned area of the NAND cache. This temporary copy is moved later to the new cache after the new association is established. If the indicated HDD partition (for the new association) is currently associated with an HDD partition, another flushing operation 810 flushes valid dirty data from a NAND partition associated with the HDD partition to the HDD partition. A removing operation 812 removes an association between the NAND partition associated with the HDD partition that is indicated for the new association. A marking operation 814 marks the cache blocks of the NAND partition (that was associated with the HDD partition) as invalid. A creating operation 816 creates an association between the NAND partition and the HDD partition. An updating operation 818 updates an association table, which may be utilized by the storage controller to document current partitions and associations.

Figure 9:
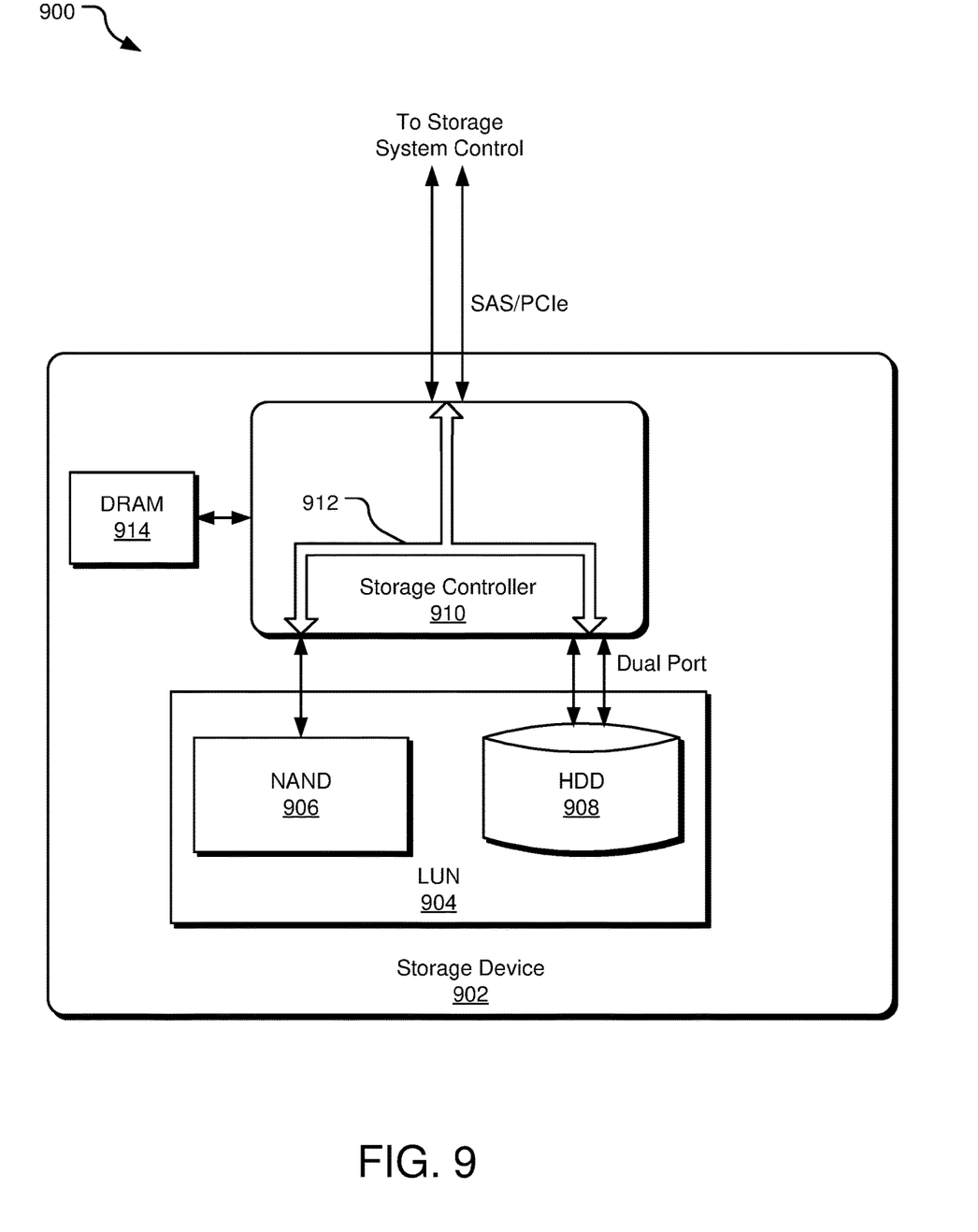
FIG. 9 illustrates a block diagram of an example storage device.

FIG. 9 illustrates a block diagram 900 of an example storage device 902. The storage device includes a storage controller 910 and at least one solid-state storage medium (e.g., a NAND 906) and disc storage medium (e.g., a HDD 908). The storage device 902 may be one of a plurality of storage devices in a storage system (e.g., a storage server). The storage controller 910 may include one or more processors that access a DRAM 914. It should be understood that the one or more processors may utilized other memory types. The storage controller 910 may include processing and circuits for controlling data movement between the NAND 906 and the HDD 908. The HDD 908 may be accessible via a dual port interface. The NAND 906 may be accessible via a NAND flash port. The storage controller 910 presents a logical unit number 904 that is addressable by an external control system (e.g., a host or SAS expander) via a dual port serial attached small computer systems interface (SAS) or peripheral component interconnect express (PCIe) interface.

The storage controller 910 and the associated communication channels (e.g., a peer to peer communication channel 912) allows the tiered storage system described above to be implemented. For example, a storage tier with a NAND partition and an HDD partition utilizes the communication channel 912 to move data between the NAND partition and the HDD partition based on one or more caching policies. In some example implementations, such data may be moved without receiving instructions from or moving data to/from a host device. Furthermore, the illustrated interfaces and channels allow the NAND to be configured as either a cache only or a user accessible SSD. Furthermore, the storage device 902 may be presented externally as a disc drive with combined capacity of the NAND 906 and the HDD 908. In example where the NAND 906 is 2 TB and the HDD is 10 TB, the storage device 902 may be exposed as a drive with 0.5 TB NAND for caching and 1.5 TB as user storage for tiering, caching, and/or performance. Such a device may further be exposed as two drives (2 TB SSD+10 TB HDD).

Figure 10:
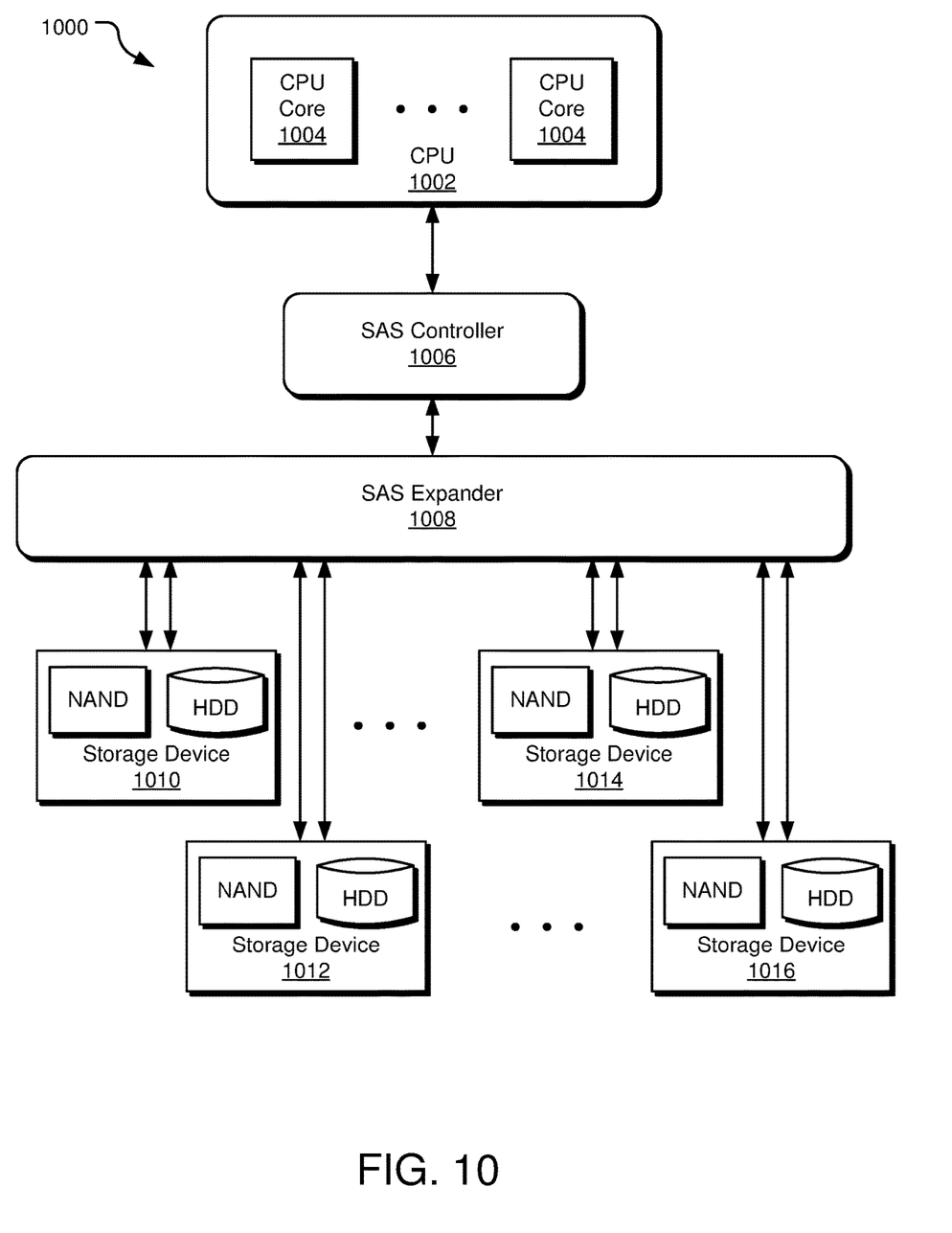
FIG. 10 illustrates a block diagram of an example storage system.

FIG. 10 illustrates a block diagram of an example storage system 1000. The storage system 1000 may be an enterprise storage server, for example. The storage system includes a plurality of CPU cores 1004 (e.g., a quad-core CPU 1002) that execute processor-executable instructions stored in one or more storage mediums (not shown) for controlling storage in the storage system 1000. The CPUs 1002 are communicatively coupled (e.g., a PCIe communication connection) to a SAS controller 1006. The SAS controller 1006 is communicatively coupled to a SAS expander 1008. The SAS expander is communicatively coupled to a plurality of storage devices (e.g., storage devices 1010, 1012, 1014, 1016). The storage devices may be implemented as the storage device 902 illustrated in FIG. 9 and include NAND and HDD storage with a peer to peer communication channel. The storage devices have a dual port SAS interface, for example, for routing data between the CPU 1002 and the storage devices. It should be understood that the implementations described herein may be applicable to protocols different from SAS. For example, the implementations are applicable to protocols such as Non-volatile memory express (NVME) over PCIe or NVME over fabrics.

The storage devices (e.g., the storage device 1010) may be presented to the SAS system (e.g., SAS controller 1006 and the SAS expander 1008) as a logical unit number (LUN). Each storage device may be differently configured (e.g., as a SSD device, HDD device, hybrid device with NAND cache, a tiered storage device) depending on storage needs. Furthermore, the storage devices may be presented as two different storage devices (e.g., SSD/NAND and an HDD) via a dual port SAS or PCIe connection. For example, the storage device 1016 includes a dual port connection 1018. The storage devices allow for a highly customizable storage system 1000.

Figure 11:
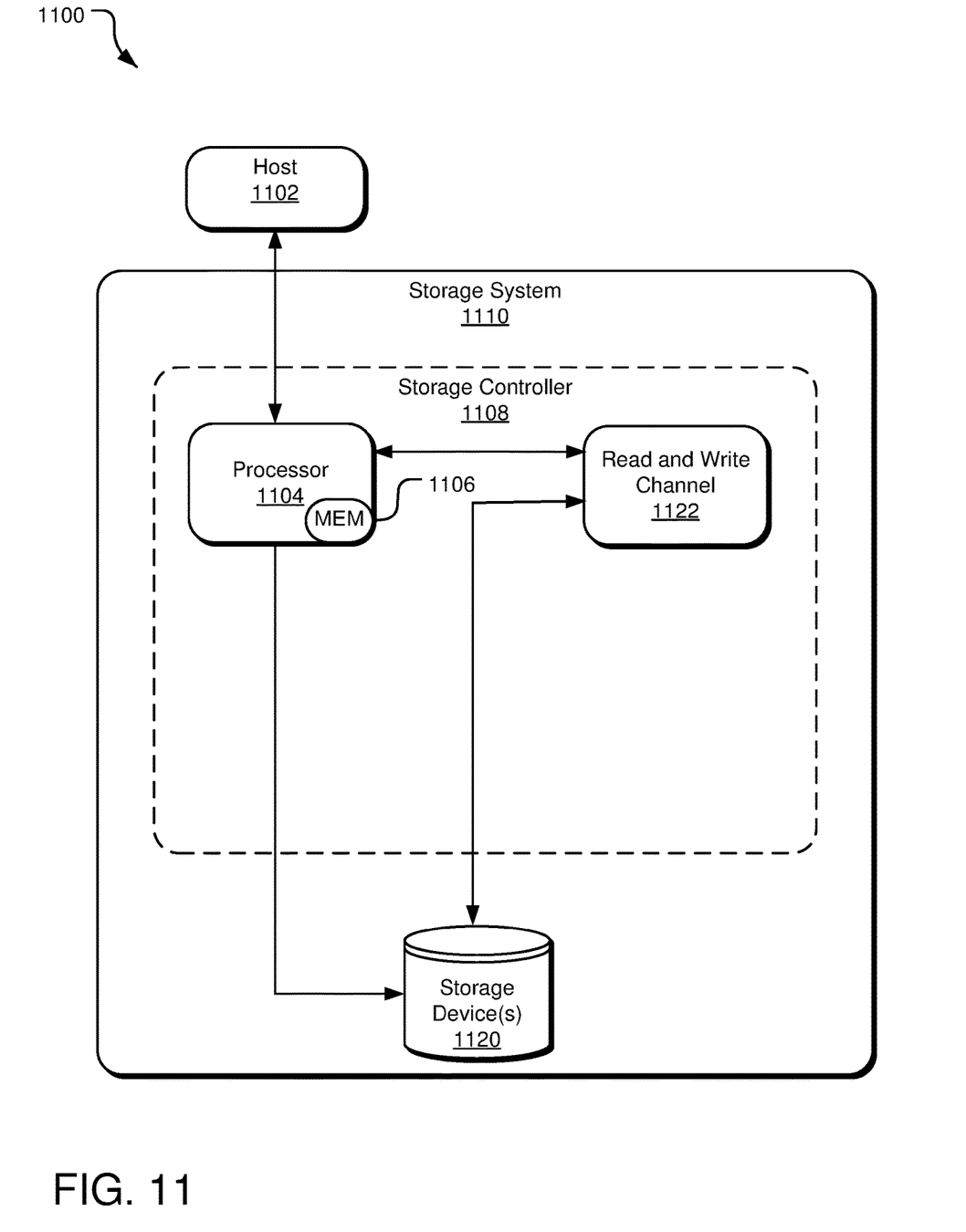
FIG. 11 illustrates an example schematic of a storage controller of a storage system.

FIG. 11 illustrates an example schematic 1100 of a storage controller 1108 of a storage system 1110. Specifically, FIG. 11 shows one or more functional circuits that are resident on a printed circuit board used to control the operation of the storage system 1110. The storage controller 1108 may be operably and communicatively connected to a host computer 1102, which may include the storage system 1110 or may be separate from the storage system. Control communication paths are provided between the host computer 1102 and a processor 1104. Control communication paths are provided between the processor 1104 and one or more storage devices 1120 (e.g., logical storage units) via a number of read/write channels (e.g., read and write channel 1122). The processor 1104 generally provides top-level communication and control for the storage controller 1108 in conjunction with processor-readable instructions for the processor 1104 encoded in processor-readable storage media (e.g., a memory 1106). The processor readable instructions further include instructions for performing self-healing, tiering, thin-provisioning, etc.

The term "processor-readable storage media" includes but is not limited to, random access memory ("RAM"), ROM, EEPROM, flash memory or other memory technology, CDROM, digital versatile discs (DVD) or other optical disc storage, magnetic cassettes, magnetic tape, magnetic disc storage or other magnetic storage devices, or any other tangible medium which can be used to store the desired information and which can be accessed by a processor. In contrast to tangible processor-readable storage media, intangible processor-readable communication signals may embody processor-readable instructions, data structures, program modules or other data resident in a modulated data signal, such as a carrier wave or other signal transport mechanism.

The storage controller 1108 controls storage of data on the storage devices 1120 (e.g., logical storage units) such as HDDs, SSD, SSHDs, flash drives, SATA drives, disc arrays, etc. Each of the storage devices may include spindle motor control circuits for controlling rotation of media (e.g., discs) and servo circuits for moving actuators between data tracks of storage media of the storage devices 1120.

Other configurations of storage controller 1108 are contemplated. For example, storage controller 1108 may include one or more of an interface circuitry, a buffer, a disc drive, associated device peripheral hardware, an encryption unit, a compression unit, a replication controller, etc. The storage controller 1108 manages read/write operations, caching, etc.

of the storage system 1110. The storage controller 1108 may be embodied in processor-readable instructions stored in the memory 1106 (a processor-readable storage media) or another processor-readable memory.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A hardware storage system comprising:
   a first storage medium configured to store data at a first speed; and
   a second storage medium configured to store data at a second speed, the second speed being lower than the first speed; and
   a storage system controller configured to:
   associate a first partition of the first storage medium with a first partition of the second storage medium to form a first storage tier;
   associate a second partition of the first storage medium with a second partition of the second storage medium to form a second storage tier, the first and second storage tiers including different capacities of the first storage medium;
   maintain an association table storing a first logical block address (LBA) range corresponding to the respective partitions of first storage tier and a second LBA range corresponding to the respective partitions of the second storage tier;
   present to a host an addressable LBA range including the first LBA range and the second LBA range; and
   receive, from the host, an access request for data that is directed to one of the first storage tier or the second storage tier using the respective addressable LBA range for first storage tier or the second storage tier, wherein the access request is directed to a given storage tier based on a frequency of access of the data.

2. The storage system of claim 1 wherein the storage system controller is further configured to:
   re-associate the first partition of the first storage medium with a different partition of the second storage medium responsive to detection of satisfaction of a tiering condition, the tiering condition being based at least on a data temperature of data allocated to the at least two storage tiers.

3. The storage system of claim 1 wherein the storage system controller is further configured to:
   modify a size of at least one of the first partition of the first storage medium and the first partition of the second storage medium responsive to detection of satisfaction of a tiering condition, the tiering condition being based at least on a data temperature of data allocated to the at least two storage tiers.

4. The storage system of claim 1 wherein the storage system controller is further configured to:
   receive instructions from a host device to change the association of the first partition of the first storage medium with a different partition of the second storage medium.

5. The storage system of claim 1 wherein data is allocated to one or more of the at least two storage tiers based at least on a data temperature of the data and the first storage medium comprises either: a solid state drive with the second storage medium comprising a hard disk drive, or the first storage medium comprises a conventional hard disk drive with the second storage medium comprising a shingled hard disk drive.

6. The storage system of claim 1 further comprising:
   a peer to peer communication channel between the first storage medium and the second storage medium wherein the first storage medium is located in a separate data storage device than the second storage medium.

7. A method comprising:
   partitioning a first storage medium into at least a first partition and a second partition, the first storage medium configured to store data at a first speed;
   partitioning a second storage medium into at least a third partition and a fourth partition, the second storage medium configured to store data at a second speed, the second speed being lower than the first speed;

associating the first partition with the third partition to form a first storage tier and associating the second partition with the fourth partition to form a second storage tier, the first partition and the second partition having different capacities;

maintaining an association table storing a first logical block address (LBA) range corresponding to the respective partitions of first storage tier and a second LBA range corresponding to the respective partitions of the second storage tier;

presenting to a host an addressable LBA range including the first LBA range and the second LBA range; and receiving from the host an access request for data that is directed to one of the first storage tier or the second storage tier using the respective addressable LBA range for the first storage tier or the second storage tier, wherein the access request is directed to a given storage tier based on a frequency of access of the data.

8. The method of claim 7 further comprising:
re-associating the first partition of the first storage medium with a different partition of the second storage medium responsive to detecting satisfaction of a tiering condition, the tiering condition being based at least on a data temperature or a data access frequency of data allocated to the storage tiers.

9. The method of claim 7 further comprising:
modifying a size of at least one of the first partition and the third partition responsive to detection of satisfaction of a tiering condition, the tiering condition being based at least on a data temperature of data allocated to the storage tiers.

10. The method of claim 7 further comprising:
re-associating the first partition of the first storage medium with a different partition of the second storage medium responsive to receiving instructions from a host device to change the association of the first partition of the first storage medium with the different partition of the second storage medium.

11. The method of claim 7 wherein data is allocated to one or more storage tiers based at least on a data temperature of the data and the first storage medium comprises a solid state drive or DRAM and the second storage medium comprises a hard disk drive.

12. The method of claim 7 further comprising:
communicating data between the first storage medium and the second storage medium via a direct communication channel without a host.

13. The method of claim 7 wherein the at least two storage tiers are managed using an association table storing associations of partitions and corresponding logical block address (LBA) ranges and the first partition has a larger capacity than the second partition while the fourth partition has a larger capacity than the third partition causing the first storage tier to have a faster speed than the second storage tier.

14. One or more tangible processor-readable storage media encoding processor-executable instructions for executing on a computer system a process to improve the computer system comprising:

partitioning a first storage medium into a first partition of the first storage medium, the first storage medium configured to operate at a first access rate;

partitioning a second storage medium into a second partition of the second storage medium, the second storage medium configured to operate at a second access rate, the second access rate being at least ninety percent slower than the first access rate;

associating the first partition with the second partition to form a first storage tier of at least two storage tiers, the at least two storage tiers including different capacities of the first storage medium maintaining an association table storing a first logical block address (LBA) range corresponding to the respective partitions of first storage tier and a second LBA range corresponding to the respective partitions of the second storage tier;

presenting to a host an addressable LBA range including the first LBA range and the second LBA range; and receiving from the host an access request for data that is directed to one of the first storage tier or the second storage tier using the respective addressable LBA range for the first storage tier or the second storage tier, wherein the access request is directed to a given storage tier based on a frequency of access of the data.

15. The one or more processor-readable storage media of claim 14 wherein the computer process further comprises:
re-associating the first partition of the first storage medium with a different partition of the second storage medium responsive to detection of satisfaction of a tiering condition, the tiering condition being based at least on a data temperature of data allocated to the at least two storage tiers.

16. The one or more processor-readable storage media of claim 14 wherein the computer process further comprises:
modifying a size of at least one of the first partition of the first storage medium and the second partition of the second storage medium responsive to detection of satisfaction of a tiering condition, the tiering condition being based at least on a data temperature of data allocated to the at least two storage tiers.

17. The one or more processor-readable storage media of claim 14 wherein the computer process further comprises:
re-associating the first partition of the first storage medium with a different partition of the second storage medium responsive to receiving instructions from a host device to change the association of the first partition of the first storage medium with the different partition of the second storage medium.

18. The one or more processor-readable storage media of claim 14 wherein data is allocated to one or more storage tiers based at least on an access frequency of the data.

19. The one or more processor-readable storage media of claim 14 wherein the computer process further comprises:
communicating data between the first storage medium and the second storage medium via a peer to peer communication channel wherein the first storage medium is located in a same data storage drive as the second storage medium.

* * * * *